Patented Mar. 26, 1940

2,195,118

UNITED STATES PATENT OFFICE 2,195,118

SULPHIDE PIGMENT

Kenneth S. Mowlds, Baltimore, Md., assignor to The Glidden Company, Cleveland, Ohio, a corporation of Ohio No Drawing. Application February 20, 1940, Serial No. 319,890

2 Claims. (Cl. 134—58)

This application is a continuation-in-part of application, Ser. No. 99,146, filed September 2, 1936 and application, Ser. No. 216,324, filed June 28, 1938.

This invention relates to pigments containing sulphides, particularly sulphide pigments and has its greatest applicability to light colored and white sulphide pigments.

Lithopone, zinc sulphide, cadmium sulphide, and similar sulphide pigments are frequently used where they come into contact with copper or copper compounds and are discolored thereby. For example, lithopone and zinc sulphide pigments are used in the wall paper industry both as pigment fillers in the body of the paper and in painting the paper with designs. However, when used in wall paper it has frequently been noticed that the pigment darkens.

On investigation it has been found that copper salts used as preservatives in the paste applied to the paper, bleed through to the pigment with the resulting formation of black copper sulphide. This occurs even though the zinc sulphide is relatively insoluble and even though the copper or copper compounds present are relatively insoluble. There are sufficient ions formed in the presence of water to cause the formation of the black copper sulphide which darkens and stains the pigment.

According to the present invention the sulphide containing pigment is treated with a salt capable of producing anions in the presence of a water, which will react with copper ions present to produce a white copper salt. Preferably, the copper salt formed should be relatively insoluble. If the copper salt formed is relatively soluble, it will, in the continued presence of water, in turn yield copper ions which will react with sulphide ions to produce copper sulphide, although if the use to which the pigment is put is such that its only contact with water is short, the white copper salt formed may be relatively soluble and still give excellent protection against staining. Also, in case the sulphide pigment is yellow, such as cadmium sulphide, the copper salt formed may be of a similar color.

Salts which may be used for treatment of the sulphide containing pigment may be thiocyanates, thio-sulphates, xanthates, cyanamides, and others which will yield anions in the presence of water which react with copper ions to produce a white or neutral colored copper salt or a copper salt of a color which blends with the pigment being treated without discoloring same. Any of these salts may be used. Sodium thiocyanate is relatively cheap and produces excellent results. Also sodium and calcium cyanamide are commercially available in relatively large quantities and may be used with good results. The sodium, potassium, calcium, and barium salts will ordinarily be used, although the invention is by no means limited thereto. As previously pointed out the salt should be one which will yield the anions in the presence of water in sufficient quantity to react with the copper ions with which the pigment comes in contact. In many instances it is preferred to use a water soluble salt as the treating agent. However, in cases where the pigment frequently comes into contact with water and the concentration of copper ions is relatively low, a water insoluble treating salt may be preferred.

The treating salts may be incorporated with the pigment in a variety of ways. They may be added dry and thoroughly mixed or they may be dissolved or dispersed in water and mixed with the pigment slurry, or added dry to the pigment slurry. For the sake of convenience and to insure uniform distribution I prefer to add them to the wet pigment slurry just before drying. The pigment slurry is preferably thick so that where a water soluble treating salt is used, as little as possible is lost on filtration.

Relatively small percentages are effective if even distribution over the pigment is obtained. I prefer to use about 1% based on the pigment content, to insure non-darkening even under very adverse conditions. Any addition of course gives protection; amounts as low as 0.1% give good results for most purposes, although higher percentages are needed where copper mold inhibiter is used in the paste on wall paper containing the pigment. Higher percentages may be used, but the cost is increased unnecessarily and pigment properties are diluted.

Example I

A typical example of my invention comprises adding 10 pounds of sodium thiocyanate to a thick slurry of calcined lithopone containing 1000 pounds of pigment. The slurry is agitated to insure distribution of the salt; the pigment is then filtered and dried. Other thiocyanates may be used in place of the sodium thiocyanate. In addition to lithopone, other sulphide pigments such as zinc sulphide, cadmium sulphide pigments or pigments containing the same may be treated. In general, any light colored pigment containing sulphide may be treated in accordance with the present invention to prevent their staining by copper.

Example II 10 pounds of sodium thiocyanate are added to a thick slurry of cadmium sulphide pigment containing 1000 pounds of pigment. The slurry is agitated to insure distribution of the salt; the pigment is then filtered and dried. Other thiocyanates may be used in place of the sodium thiocyanate. Also, a part of the cadmium sulphide may be replaced by a corresponding amount of zinc sulphide.

Example III 5 to 10 pounds of sodium thiocyanate are added to a thick slurry of cadmium lithopone containing 1000 pounds of pigment. The slurry is agitated to insure distribution of the salt; the pigment is then filtered and dried. Other thiocyanates may be used in place of the sodium thiocyanate.

I claim as my invention:

1. A pigment composition consisting of a cadmium sulphide pigment and a water soluble thiocyanate.

2. A pigment composition consisting of cadmium lithopone and a water soluble thiocyanate.

KENNETH S. MOWLDS.